United States Patent
Xu et al.

(10) Patent No.: US 11,160,083 B2
(45) Date of Patent: Oct. 26, 2021

(54) METHOD AND APPARATUS FOR COORDINATING TERMINAL CAPABILITIES FOR LTE/NR INTERWORKING IN WIRELESS COMMUNICATION SYSTEM

(71) Applicant: LG Electronics Inc., Seoul (KR)

(72) Inventors: Jian Xu, Seoul (KR); Seokjung Kim, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 16/495,981

(22) PCT Filed: Mar. 23, 2018

(86) PCT No.: PCT/KR2018/003405
§ 371 (c)(1),
(2) Date: Sep. 20, 2019

(87) PCT Pub. No.: WO2018/174624
PCT Pub. Date: Sep. 27, 2018

(65) Prior Publication Data
US 2020/0053716 A1  Feb. 13, 2020

Related U.S. Application Data

(60) Provisional application No. 62/475,810, filed on Mar. 23, 2017.

(51) Int. Cl.
*H04W 72/04* (2009.01)
*H04W 8/24* (2009.01)
(Continued)

(52) U.S. Cl.
CPC ........... *H04W 72/048* (2013.01); *H04W 8/24* (2013.01); *H04W 76/27* (2018.02); *H04W 88/06* (2013.01)

(58) Field of Classification Search
CPC ... H04W 72/04; H04W 72/048; H04W 76/20; H04W 76/27; H04W 8/22; H04W 8/24; H04W 88/06
See application file for complete search history.

(56) References Cited

U.S. PATENT DOCUMENTS

2015/0208366 A1    7/2015  Papasakellariou et al.
2017/0251460 A1*   8/2017  Agiwal ............. H04W 72/0406
(Continued)

FOREIGN PATENT DOCUMENTS

KR    1020140133463    11/2014
KR    1020150005458     1/2015
(Continued)

OTHER PUBLICATIONS

ZTE, "UE Capability Coordination over XnAP and X2AP Due to NR-LTE Tight Interworking", Feb. 13-17, 2017, 3GPP TSG RAN WG3#95, R3-170536, pp. 1-3 (Year: 2017).*

(Continued)

*Primary Examiner* — Paul H Masur
(74) *Attorney, Agent, or Firm* — Dentons US LLP

(57) ABSTRACT

A method and an apparatus in which long-term evolution (LTE) and new radio access technology (NR) coordinate/ negotiate information on user equipment (UE) capabilities when the LTE and the NR are linked through a dual connection in a wireless communication system. A first radio access network (RAN) node transmits the UE capability already used by the first RAN node and/or the UE capability remaining or recommended to be used by a RAN node 2 to the second RAN node. The second RAN node transmits the UE capability to be used by the second RAN node to the first RAN node on the basis of the received information.

5 Claims, 13 Drawing Sheets

(51) Int. Cl.
*H04W 76/27* (2018.01)
*H04W 88/06* (2009.01)

(56) References Cited

U.S. PATENT DOCUMENTS

| | | | | |
|---|---|---|---|---|
| 2018/0279215 A1* | 9/2018 | Xu | ............... | H04W 76/15 |
| 2018/0279218 A1* | 9/2018 | Park | ............... | H04W 36/08 |
| 2019/0342932 A1* | 11/2019 | Futaki | ............... | H04W 76/15 |
| 2020/0077312 A1* | 3/2020 | Tsuboi | ............... | H04W 36/0027 |
| 2020/0267791 A1* | 8/2020 | Yilmaz | ............... | H04W 76/16 |

FOREIGN PATENT DOCUMENTS

| | | |
|---|---|---|
| KR | 1020170018064 | 2/2017 |
| KR | 1020170028330 | 3/2017 |

OTHER PUBLICATIONS

ZTE, "TP for UE Capability Coordination over XnAP and X2AP", Feb. 13-17, 2017, 3GPP TSG RAN WG3#95, R3-170537, pp. 1-4 (Year: 2017).*

Qualcomm, "UE capability handling", Feb. 13-17, 2017, 3GPP TSG-RAN WG3 #95, R3-170648, pp. 1-5 (Year: 2017).*

Qualcomm, "TP for UE capability handling", Feb. 13-17, 2017, 3GPP TSG-RAN WG3 #95, R3-170649, pp. 1-3 (Year: 2017).*

3GPP, "X2 application protocol (X2AP)", Jan. 2017, 3GPP TS 36.423, V14.1.0, pp. 1-240 (Year: 2017).*

* cited by examiner

US 11,160,083 B2

METHOD AND APPARATUS FOR COORDINATING TERMINAL CAPABILITIES FOR LTE/NR INTERWORKING IN WIRELESS COMMUNICATION SYSTEM

This application is the National Stage filing under 35 U.S.C. 371 of International Application No. PCT/KR2018/003405, filed on Mar. 23, 2018, which claims the benefit of U.S. Provisional Application No. 62/475,810 filed on Mar. 23, 2017, the contents of which are all hereby incorporated by reference herein in their entirety.

TECHNICAL FIELD

The present disclosure relates to wireless communication and, more particularly, to a method and apparatus for coordinating UE capabilities for the $3^{rd}$ generation partnership project (3GPP) long-term evolution (LTE) and new radio access technology (NR) interworking in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. The NR system may be called another name, e.g. new radio access technology (new RAT). 3GPP has to identify and develop the technology components needed for successfully standardizing the NR timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

According to new architecture for the 5G core network and 5G radio access network (RAN) including NR, a user equipment (UE) may receive a better service in view of throughput and UE experience. Also, tight interworking of LTE/NR is under discussion. Due to tight interworking of LTE/NR, interworking between an eNodeB (eNB) and a new RAN node (for example, gNB) is allowed, and as a result, throughput of a UE may be improved. An eNB of the LTE and gNB of the NR may manage resources individually. More specifically, dual/multiple connections for improving throughput of a UE according to the tight interworking of LTE/NR may be used, and signaling for UE mobility may be simplified.

SUMMARY

There may arise issues of how to coordinate the UE capabilities within an RAN node that performs tight interworking of the LTE/NR. More specifically, when UE capabilities based on the LTE and UE capabilities based on NR are managed by eNB and gNB respectively, and if use of UE capabilities in one RAT between LTE/NR affects the use of UE capabilities in the other RAT, coordination of the UE capabilities between LTE/NR is needed.

In an aspect, a method for transmitting information on a user equipment (UE) capability by a first radio access network (RAN) node in a wireless communication system is provided. The method includes transmitting, by the first RAN node to a second RAN node, first information on at least one of a first UE capability for the first RAN node or a second UE capability for the second RAN node, and receiving, by the first RAN node from the second RAN node, second information on the second UE capability, wherein the second UE capability is determined by the second RAN node based on the first information.

In another aspect, a method for transmitting information on a user equipment (UE) capability by a first radio access network (RAN) node in a wireless communication system is provided. The method includes receiving, by the first RAN node from a second RAN node, information on a UE capability for the second RAN node, determining, by the first RAN node, the UE capability for the second RAN node, based on the information on the UE capability for the second RAN node and a UE capability for the first RAN node, and transmitting, by the first RAN node to the second RAN node, the UE capability for the second RAN node.

In an aspect, a method for transmitting information on a user equipment (UE) capability by a first radio access network (RAN) node in a wireless communication system is provided. The method includes transmitting, by the first RAN node to a second RAN node, first information on at least one of a first UE capability for the first RAN node or a second UE capability for the second RAN node, and receiving, by the first RAN node from the second RAN node, second information on the second UE capability, wherein the second UE capability is determined by the second RAN node based on the first information.

In another aspect, a method for transmitting information on a user equipment (UE) capability by a first radio access network (RAN) node in a wireless communication system is provided. The method includes receiving, by the first RAN node from a second RAN node, information on a UE capability for the second RAN node, determining, by the first RAN node, the UE capability for the second RAN node, based on the information on the UE capability for the second RAN node and a UE capability for the first RAN node, and transmitting, by the first RAN node to the second RAN node, the UE capability for the second RAN node.

DETAILED DESCRIPTION

Hereinafter, in the present disclosure, a wireless communication system based on a 3rd generation partnership project (3GPP) or institute of electrical and electronics engineers (IEEE) is mainly described. However, the present disclosure is not limited thereto, and the present disclosure may be applied to other wireless communication systems having the same characteristics to be described hereinafter.

Figure 1:
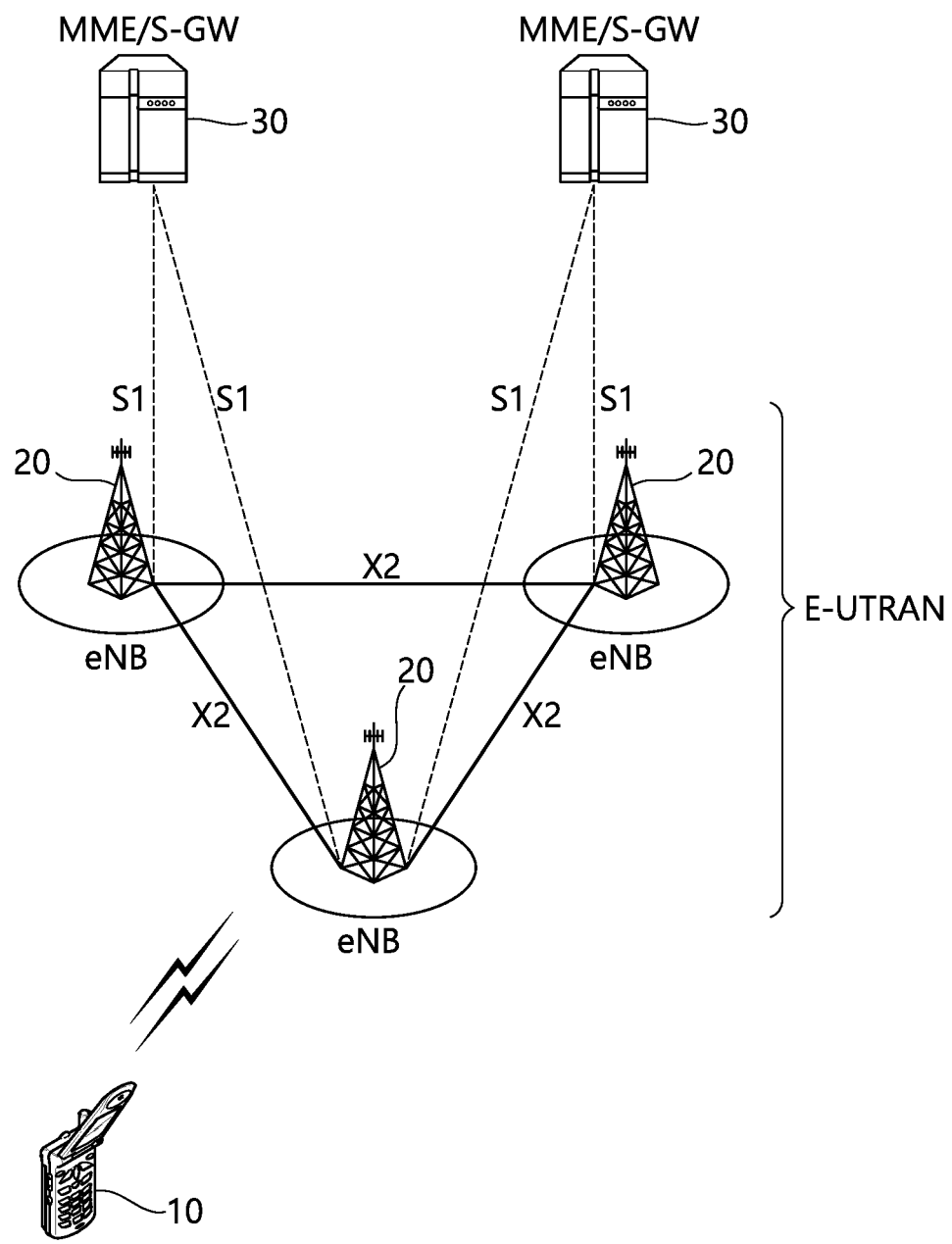
FIG. 1 shows 3GPP LTE system architecture.

FIG. 1 shows 3GPP LTE system architecture. Referring to FIG. 1, the 3GPP long-term evolution (LTE) system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. The eNB 20 is connected to the gateway 30 via an S1 interface. 5G system is a 3GPP system consisting of 5G access network (AN), 5G core network (CN) and UE. 5G access network is an access network comprising a next generation radio access network (NG-RAN) and/or non-3GPP access network connecting to a 5G core network. NG-RAN is a radio access network that supports one or more of the following options with the common characteristics that it connects to 5G core network:

1) Standalone new radio (NR).
2) NR is the anchor with E-UTRA extensions.
3) Standalone E-UTRA.
4) E-UTRA is the anchor with NR extensions.

Figure 2:
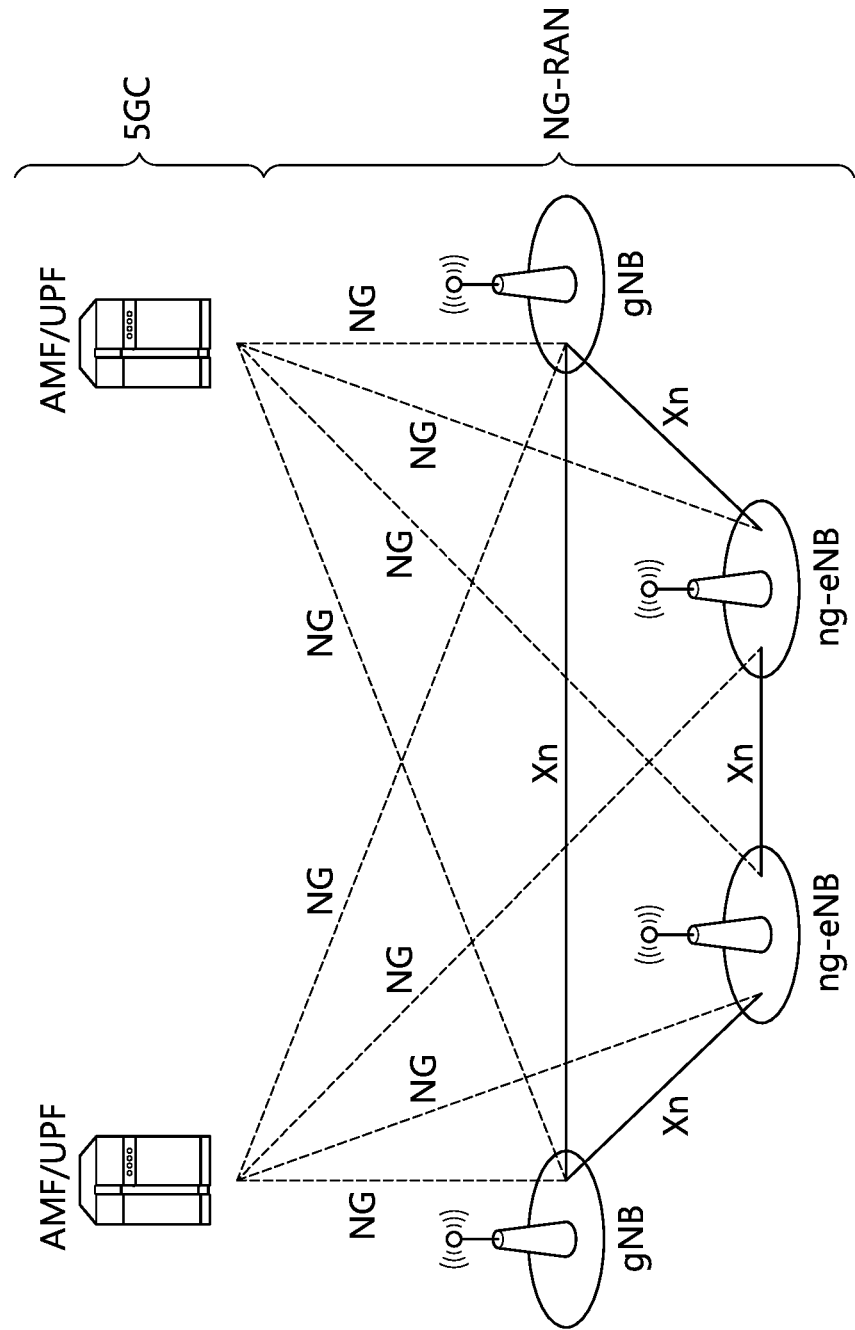
FIG. 2 shows an NG-RAN architecture.

FIG. 2 shows an NG-RAN architecture. Referring to FIG. 2, the NG-RAN includes at least one NG-RAN node. The NG-RAN node includes at least one gNB and/or at least one ng-eNB. The gNB provides NR user plane and control plane protocol terminations towards the UE. The ng-eNB provides E-UTRA user plane and control plane protocol terminations towards the UE. The gNBs and ng-eNBs are interconnected with each other by means of the Xn interface. The gNBs and ng-eNBs are also connected by means of the NG interfaces to the 5G CN. More specifically, the gNBs and ng-eNBs are connected to the access and mobility management function (AMF) by means of the NG-C interface and to the user plane function (UPF) by means of the NG-U interface.

The gNB and ng-eNB host the following functions:

Functions for radio resource management: Radio bearer control, radio admission control, connection mobility control, dynamic allocation of resources to UEs in both uplink and downlink (scheduling);

Internet protocol (IP) header compression, encryption and integrity protection of data;

Selection of an AMF at UE attachment when no routing to an AMF can be determined from the information provided by the UE;

Routing of user plane data towards UPF(s);

Routing of control plane information towards AMF;

Connection setup and release;

Scheduling and transmission of paging messages;

Scheduling and transmission of system broadcast information (originated from the AMF or operations & maintenance (O&M));

Measurement and measurement reporting configuration for mobility and scheduling;

Transport level packet marking in the uplink;

Session management;

Support of network slicing;

QoS flow management and mapping to data radio bearers;

Support of UEs in RRC_INACTIVE state;

Distribution function for non-assess stratum (NAS) messages;

Radio access network sharing;

Dual connectivity;

Tight interworking between NR and E-UTRA.

The AMF hosts the following main functions:

NAS signaling termination;

NAS signaling security;

AS security control;

Inter CN node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing;

Session management function (SMF) selection.

The UPF hosts the following main functions:

Anchor point for Intra-/Inter-radio access technology (RAT) mobility (when applicable);

External protocol data unit (PDU) session point of interconnect to data network;

Packet routing & forwarding;

Packet inspection and user plane part of policy rule enforcement;

Traffic usage reporting;

Uplink classifier to support routing traffic flows to a data network;

Branching point to support multi-homed PDU session;

QoS handling for user plane, e.g. packet filtering, gating, UL/DL rate enforcement;

Uplink traffic verification (service data flow (SDF) to QoS flow mapping);

Downlink packet buffering and downlink data notification triggering.

The SMF hosts the following main functions:

Session management;

UE IP address allocation and management;

Selection and control of UP function;

Configures traffic steering at UPF to route traffic to proper destination;

Control part of policy enforcement and QoS;

Downlink data notification.

In what follows, multi-RAT dual connectivity will be described. NG-RAN supports multi-RAT dual connectivity configured so that a UE in the RRC_CONNECTED state with multiple RX/TX may use radio resources provided by two separate schedulers. Multi-RAT dual connectivity is generalization of the E-UTRA dual connectivity. Two separate schedulers are located at two different NG-RAN nodes connected to each other through a non-ideal backhaul. One of the two different NG-RAN nodes performs the role of a master node (MN), and the other one performs the role of a secondary node (SN). In other words, one scheduler is located at the MN while the other scheduler is located at the SN. The two different NG-RAN nodes provide either the E-UTRA connectivity (when the NG-RAN node is an ng-eNB) or NR connectivity (when the NG-RAN node is a gNB). The ng-eNB is a node that provides the NR user plane and control plane protocol termination toward a UE and operates as an SN in the E-UTRAN-NR dual connectivity (EN-DC). The gNB is a node that provides the E-UTRA user plane and control plane protocol termination toward a UE and is connected to 5G CN through an NG interface. The MN and SN are connected to each other through a network interface, and at least the MN is connected to the core network. Although multi-RAT dual connectivity in the present disclosure has been designed based on a non-ideal backhaul between different nodes, the multi-RAT dual connectivity may also be used for an ideal backhaul.

Figure 3:
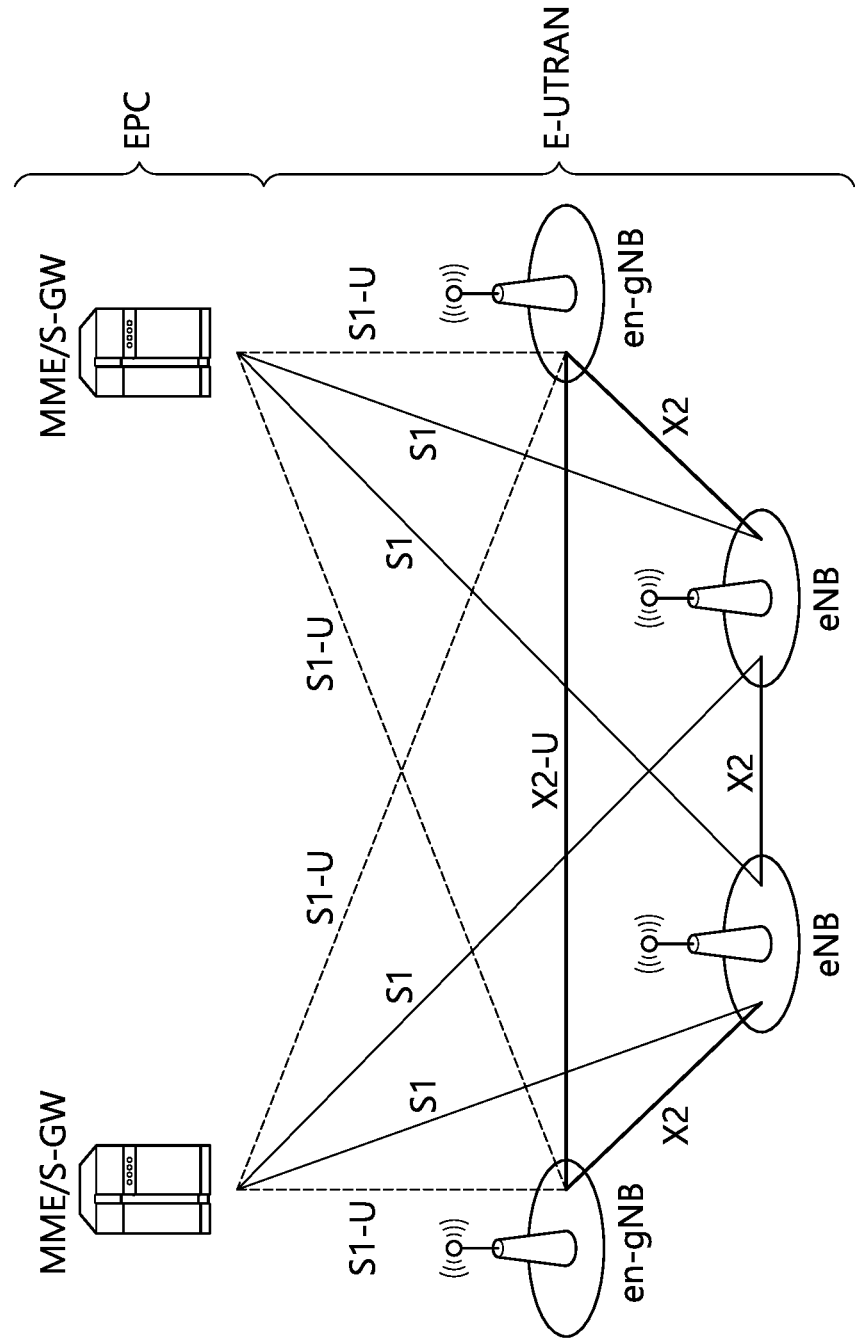
FIG. 3 shows EN-DC architecture.

FIG. 3 shows EN-DC architecture. The E-UTRAN supports multi-RAT dual connectivity through EN-DC, where a UE is connected to one eNB operating as an MN and one en-gNB operating as an SN. An eNB is connected to EPC through S1 interface and connected to en-gNB through X2 interface. The en-gNB may be connected to the EPC through S1-U interface and connected to a different en-gNB through X2-U interface.

The 5G CN also supports multi-RAT dual connectivity. An NG-RAN supports NG-RAN E-UTRA-NR dual connectivity (NGEN-DC), where a UE is connected to one ng-eNB operating as an MN and one gNB operating as an SN. The ng-eNB is connected to the 5G CN, and the gNB is connected to the ng-eNB through Xn interface. Also, the NG-RAN supports NR-E-UTRA dual connectivity (NE-DC), where a UE is connected to one gNB operating as an MN and one ng-eNB operating as an SN. The gNB is connected to the 5G CN, and ng-eNB is connected to the gNB through Xn interface.

To support the aforementioned multi-RAT dual connectivity and/or tight interworking of LTE/NR, various disposition scenarios for LTE and NR may be considered.

Figure 4:
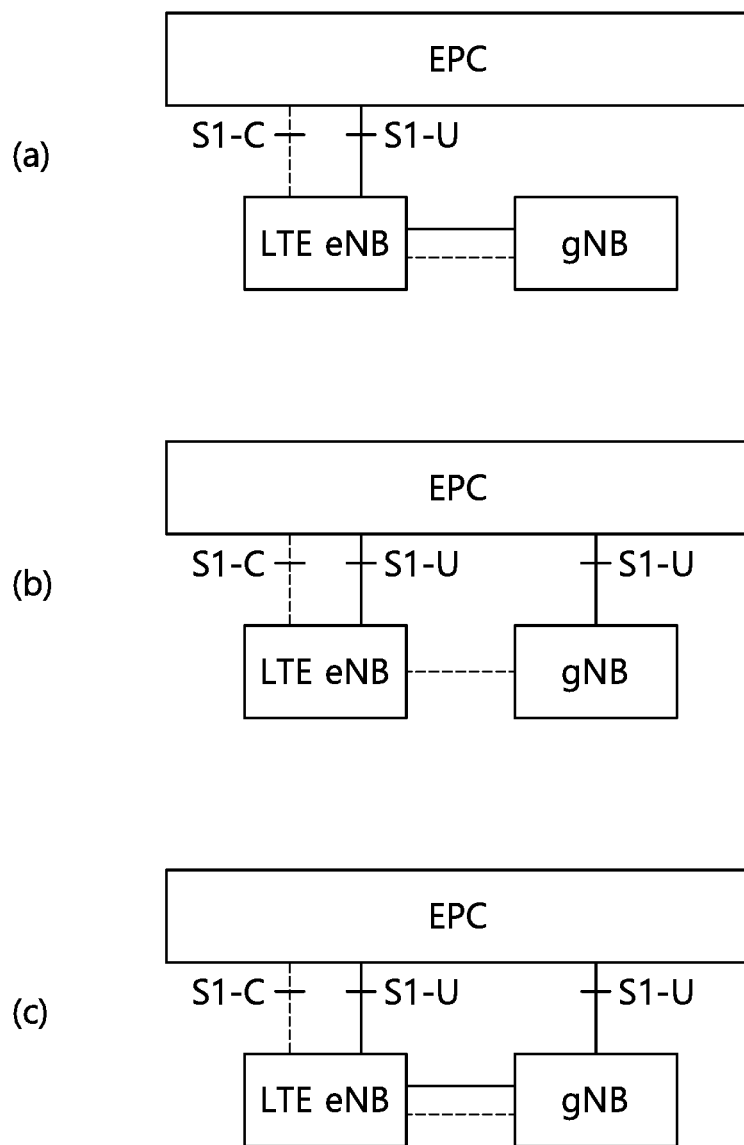
FIG. 4 shows option 3/3a/3x of the deployment scenario for tight interworking of LTE/NR.

FIG. 4 shows option 3/3a/3x of the deployment scenario for tight interworking of LTE/NR. FIG. 4(a) may be referred to as option 3, FIG. 4(b) as option 3a, and FIG. 4(c) as option 3x. In option 3/3a/3x, the LTE eNB is connected to the EPC with non-standalone NR. In other words, NR control plane is not directly connected to the EPC but connected through the LTE eNB. The NR user plane is connected to the EPC via the LTE eNB (option 3) or directly via the S1-U interface (option 3a). Or the user plane connected directly through the S1-U interface is split to the LTE eNB in the gNB (option 3x). The option 3/3a/3x correspond to the EN-DC architecture described in detail with reference to FIG. 3.

Figure 5:
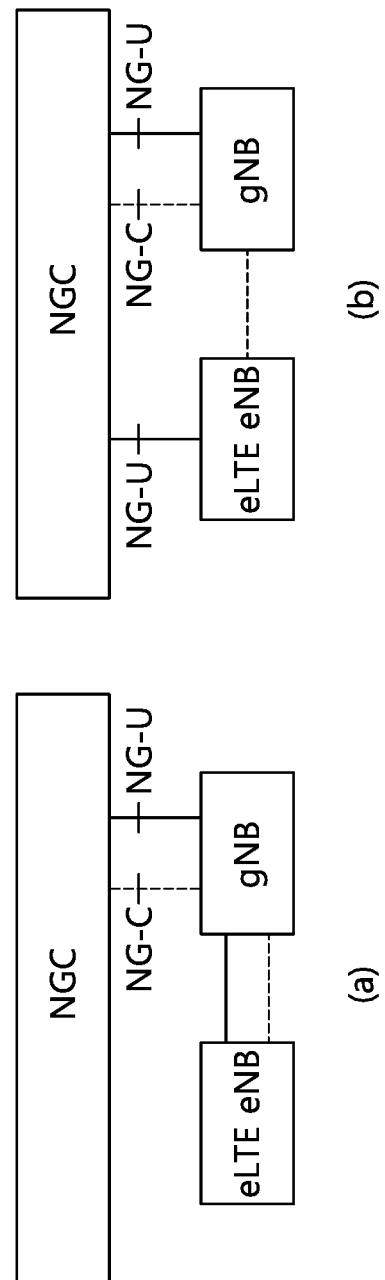
FIG. 5 shows option 4/4a of the deployment scenario for tight interworking of LTE/NR.

FIG. 5 shows option 4/4a of the deployment scenario for tight interworking of LTE/NR. FIG. 5(a) may be referred to as option 4, and FIG. 5(b) as option 4a. In option 4/4a, the gNB is connected to the NGC with non-standalone E-UTRA. In other words, the E-UTRA control plane is not directly connected to the NGC but connected through the gNB. The E-UTRA user plane is connected to the NGC via the gNB (option 4) or directly through the NG-U interface (option 4a). The option 4/4a correspond to the option 3/3a with the E-UTRA and NR interchanged.

Figure 6:
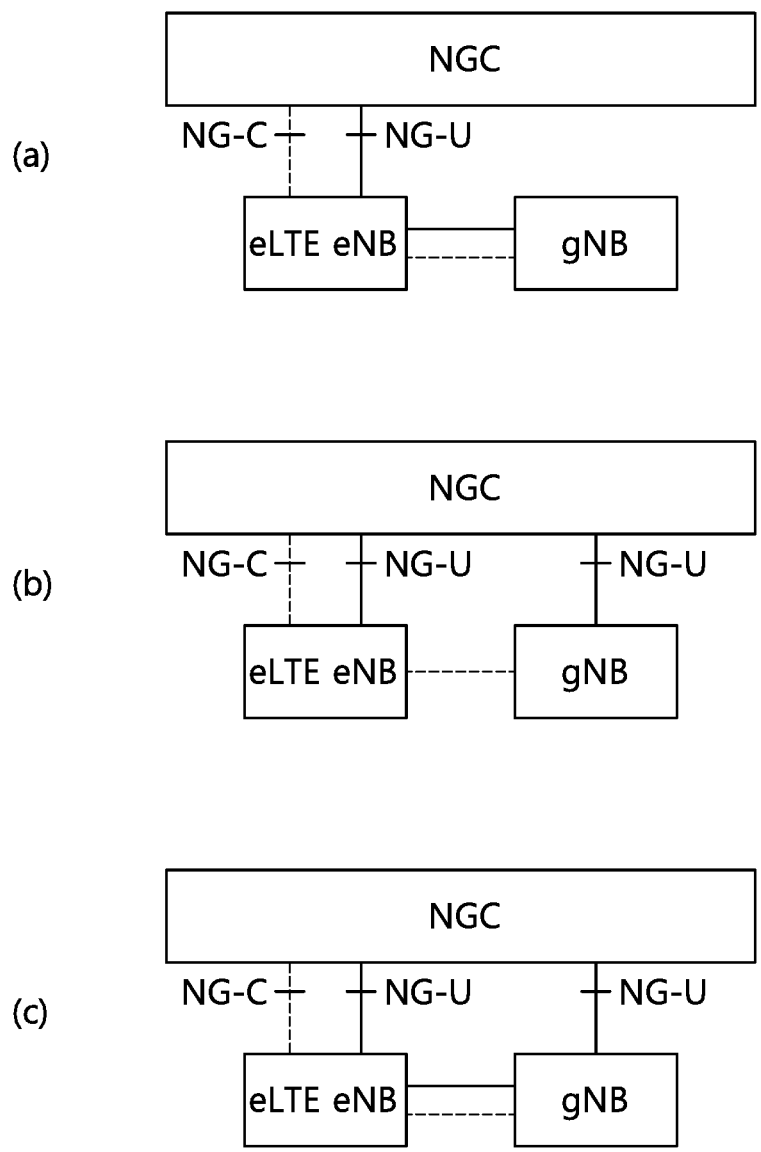
FIG. 6 shows option 7/7a/7x of the deployment scenario for tight interworking of LTE/NR.

FIG. 6 shows option 7/7a/7x of the deployment scenario for tight interworking of LTE/NR. FIG. 6(a) may be referred to as option 7, FIG. 6(b) as option 7a, and FIG. 6(c) as option 7x. In option 7/7a/7x, the eLTE eNB (namely ng-eNB) is connected to the NGC with non-standalone NR. In other words, NR control plane is not directly connected to the NGC but connected through the eLTE eNB. The NR user plane is connected to the NGC via the eLTE eNB (option 7) or directly through the NG-U interface (option 7a). Or the user plane connected directly through the NG-U interface is split to the eLTE eNB in the gNB (option 7x).

While the UE capabilities based on the conventional LTE are retained, the UE capabilities based on NR will be introduced. To support tight interworking between LTE and NR, the UE capabilities are managed by the respective RAN nodes of LTE and NR, namely eNB and gNB. In other words, the UE capabilities in the LTE are managed by eNB while the UE capabilities in the NR are managed by gNB. The UE capabilities may be categorized into three types as follows.

1) Type 1: Use of the UE capabilities is confined to within one RAT. In other words, use of the UE capabilities of type 1 in one RAT does not affect other RATs. Also, use of the UE capabilities of type 1 does not have to be coordinated with other RATs. For the UE capabilities of type 1, coordination of UE capabilities between RATs is not required.

2) Type 2: Use of the UE capabilities in one RAT affects other RATs. However, use of the UE capabilities of type 2 in one RAT is not understood by the network of other RATs. For the UE capabilities of type 2, coordination of UE capabilities between RATs is required. Also, use of the UE capabilities of type 2 may require radio resource control (RRC) reconfiguration. For example, UE capabilities of type 2 include radio frequency (RF) capability.

3) Type 3: Use of the UE capabilities in one RAT affects other RATs. Also, use of the UE capabilities of type 3 in one RAT is understood by the network of other RATs. For the UE capabilities of type 3, coordination of UE capabilities between RATs is required. However, use of the UE capabilities of type 3 does not require RRC reconfiguration of the UE. For example, UE capabilities of type 3 include buffer size.

As descried above, although coordination of UE capabilities between LTE and NR is not required for the UE capabilities of type 1, coordinate of UE capabilities between LTE and NR is needed for the UE capabilities of types 2 and 3. This is so because, for the UE capabilities of types 2 and 3, use of the UE capabilities in one RAT affects other RATs. More specifically, for the UE capabilities of types 2 and 3, each RAN node of the LTE and NR should be able to coordinate the UE capabilities in each RAT so that the sum of the UE capabilities in each RAT does not exceed the total capability of the UE.

To solve the problem above, the present disclosure proposes a method for coordinating/negotiating UE capabilities of LTE and NR.

1. Embodiment 1

Figure 7:
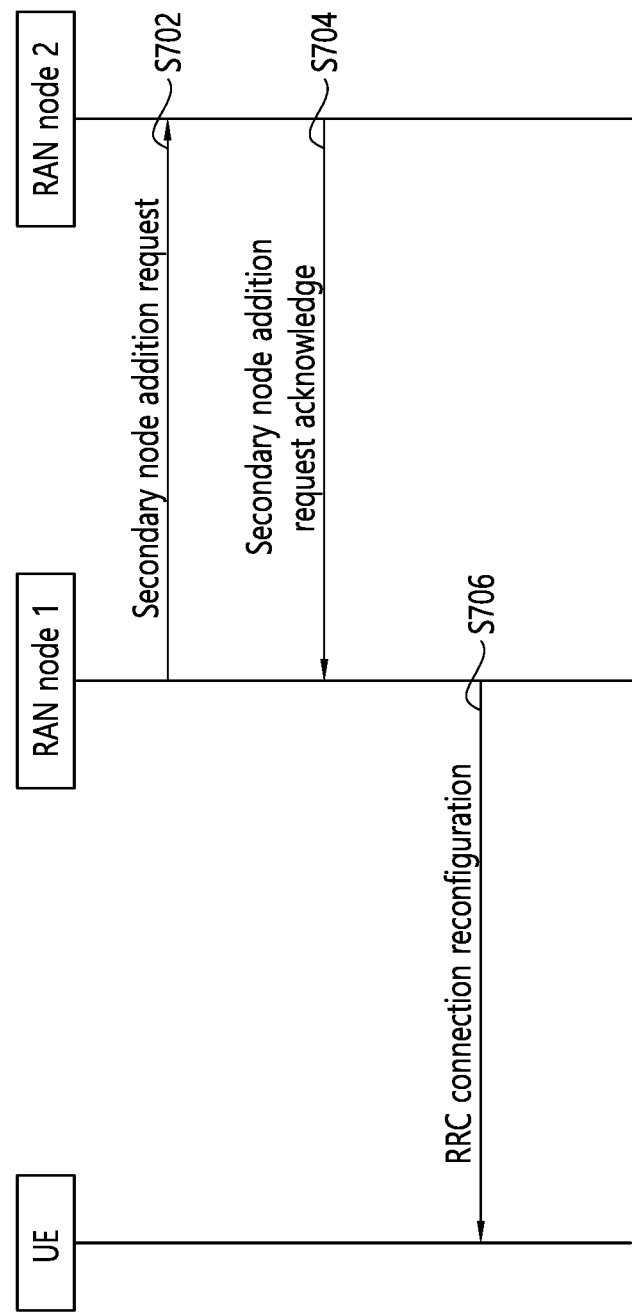
FIG. 7 shows a method for negotiating a UE capability by using a secondary node addition procedure according to an embodiment of the present disclosure.

FIG. 7 shows a method for negotiating a UE capability by using a secondary node addition procedure according to an embodiment of the present disclosure. This embodiment may be applied to the initial addition of a secondary node. In this embodiment, the RAN node 1 is a MN in EN-DC or MR-DC for LTE/NR interworking. The RAN node 1 may be a gNB or enhanced eNB, i.e. ng-eNB. The RAN node 2 is a SN in EN-DC or MR-DC for LTE/NR interworking. The RAN node 2 may be a gNB or enhanced eNB, i.e. ng-eNB.

The RAN node 1 decides to add a secondary node to serve a specific UE. The RAN node 1 decides a UE capability to be used by the RAN node 1 and the remained UE capability from the total UE capability to be used by the RAN node 2.

In step S702, the RAN node 1 transmits a secondary node addition request message to the RAN node 2. The secondary node addition request message may include at least one of the followings.

UE capability parameters, e.g. RF (radio frequency) capability (band combinations), buffer size (HARQ (hybrid automatic repeat request) buffer split), UL (uplink) transmit power, etc., which are remained/recommended to be used by the RAN node 2

UE capability parameters, e.g. RF capability (band combinations), buffer size (HARQ buffer split), UL transmit power, etc., which were already used by the RAN node 1

Upon receiving the secondary node addition request message from the RAN node 1, the RAN node 2 decides a UE capability to be used by the RAN node 2, based on the information received via the secondary node addition request message. The sum of the UE capability used by the RAN node 1 and the UE capability used by the RAN node 2 should not go beyond the total UE capability. If the secondary node addition request message includes UE capability parameters which were already used by the RAN node 1, the RAN node 2 may decide the UE capability to be used by the RAN node 2 based on the total UE capability and the UE capability used by the RAN node 1. If the secondary node addition request message includes UE capability parameters which are remained/recommended to be used by the RAN node 2, the RAN node 2 may decide the UE capability to be used by the RAN node 2 within the remained/recommended UE capability, since the remained/recommended UE capability may be determined by already considering the total UE capability and the UE capability used by the RAN node 1.

In step S704, the RAN node 2 transmits a secondary node addition request acknowledge message to the RAN node 1. The secondary node addition request acknowledge message may include UE capability parameters, e.g. RF capability (band combinations), buffer size (HARQ buffer split), UL transmit power, which are finally decided to be used by the RAN node 2.

Upon receiving the secondary node addition request acknowledge message from the RAN node 2, the RAN node 1 checks the UE capability used by the RAN node 1 and the UE capability to be used by the RAN node 2 which is received via the secondary node addition request acknowledge message.

In step S706, the RAN node 1 transmits a radio resource control (RRC) connection reconfiguration (RRCConnectionReconfigufation) message to the UE. The RRC connection reconfiguration message may include the final UE capabilities from the RAN node 1 and the RAN node 2.

2. Embodiment 2

Figure 8:
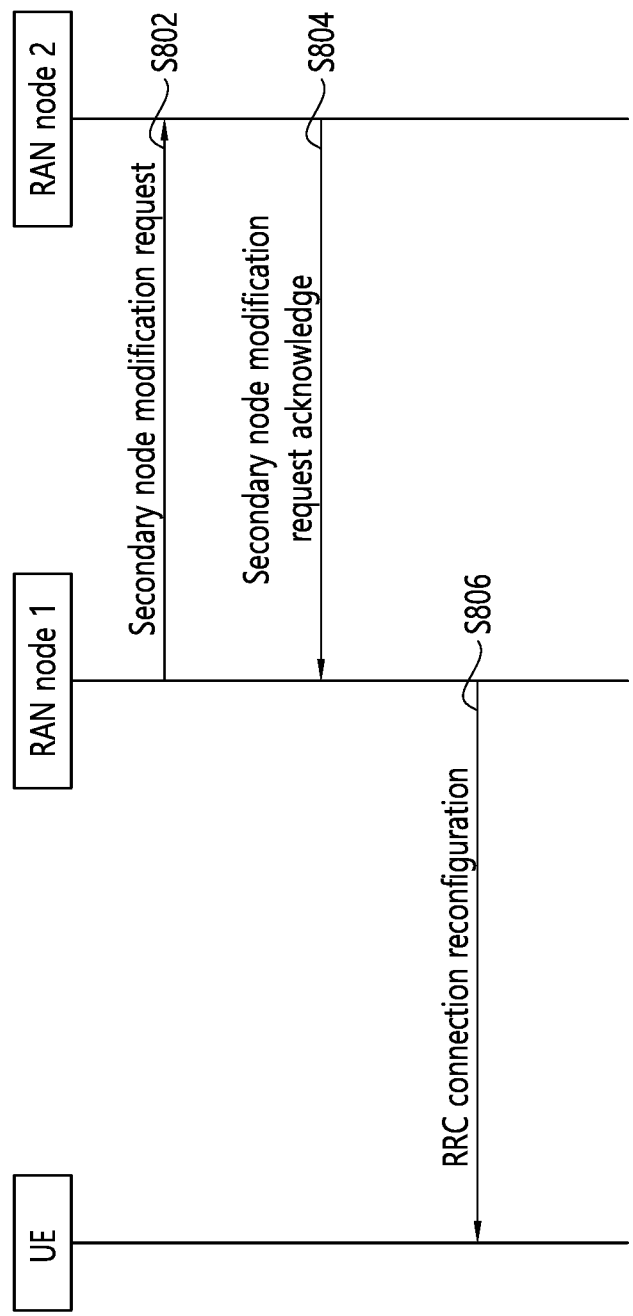
FIG. 8 shows a method for negotiating a UE capability by using a secondary node modification procedure according to an embodiment of the present disclosure.

FIG. 8 shows a method for negotiating a UE capability by using a secondary node modification procedure according to an embodiment of the present disclosure. This embodiment may be applied to the modification of a secondary node on the UE capability related negotiation. In this embodiment, the RAN node 1 is a MN in EN-DC or MR-DC for LTE/NR interworking. The RAN node 1 may be a gNB or enhanced eNB, i.e. ng-eNB. The RAN node 2 is a SN in EN-DC or MR-DC for LTE/NR interworking. The RAN node 2 may be a gNB or enhanced eNB, i.e. ng-eNB.

The RAN node 1 decides to modify the UE capability used by the RAN node 1 and/or to recommend the RAN node 2 to change the UE capability used by the RAN node 2 on a specific UE. For example, the RAN node 1 may decide to increase the UE capability to be used by the RAN node 1, and as a result, may decide to recommend the new (i.e. decreased) UE capability to the RAN node 2. For another example, the RAN node 1 may decide to decrease the UE capability to be used by the RAN node 1, and as a result, may decide to recommend the new (i.e. increased) UE capability to the RAN node 2.

In step S802, the RAN node 1 transmits a secondary node modification request message to the RAN node 2. The secondary node modification request message may include at least one of the followings.

UE capability parameters, e.g. RF capability (band combinations), buffer size (HARQ buffer split), UL transmit power, etc., which are remained/recommended to be used by the RAN node 2

UE capability parameters, e.g. RF capability (band combinations), buffer size (HARQ buffer split), UL transmit power, etc., which are updated (i.e. increased/decreased) to be used by the RAN node 1

Upon receiving the secondary node modification request message from the RAN node 1, the RAN node 2 decides a UE capability to be used by the RAN node 2, based on the information received via the secondary node modification request message. The sum of the UE capability used by the RAN node 1 and the UE capability used by the RAN node 2 should not go beyond the total UE capability. If the secondary node modification request message includes UE capability parameters which are updated to be used by the RAN node 1, the RAN node 2 may decide the UE capability to be used by the RAN node 2 based on the total UE capability and the UE capability updated to be used by the RAN node 1. If the secondary node modification request message includes UE capability parameters which are remained/recommended to be used by the RAN node 2, the RAN node 2 may decide the UE capability to be used by the RAN node 2 within the remained/recommended UE capability, since the remained/recommended UE capability may be determined by already considering the total UE capability and the UE capability updated to be used by the RAN node 1.

In step S804, the RAN node 2 transmits a secondary node modification request acknowledge message to the RAN node 1. The secondary node modification request acknowledge message may include UE capability parameters, e.g. RF capability (band combinations), buffer size (HARQ buffer split), UL transmit power, which are finally decided to be used by the RAN node 2.

Upon receiving the secondary node modification request acknowledge message from the RAN node 2, the RAN node 1 checks the UE capability used by the RAN node 1 and the UE capability to be used by the RAN node 2 which is received via the secondary node modification request acknowledge message.

In step S806, the RAN node 1 transmits an RRC connection reconfiguration (RRCConnectionReconfigufation) message to the UE. The RRC connection reconfiguration message may include the final UE capabilities from the RAN node 1 and the RAN node 2. This step may be optional depending on the type of re-negotiated UE capability parameters. For example, if the modified UE capability is RF capability, which involves a reconfiguration of the UE, the RAN node 1 may transmit the RRCConnection Reconfiguration message to the UE. If the modified UE capability is buffer size, which does not involve a reconfiguration of the UE, the RAN node 1 may not transmit the RRC Connection Reconfiguration message to the UE.

3. Embodiment 3

Figure 9:
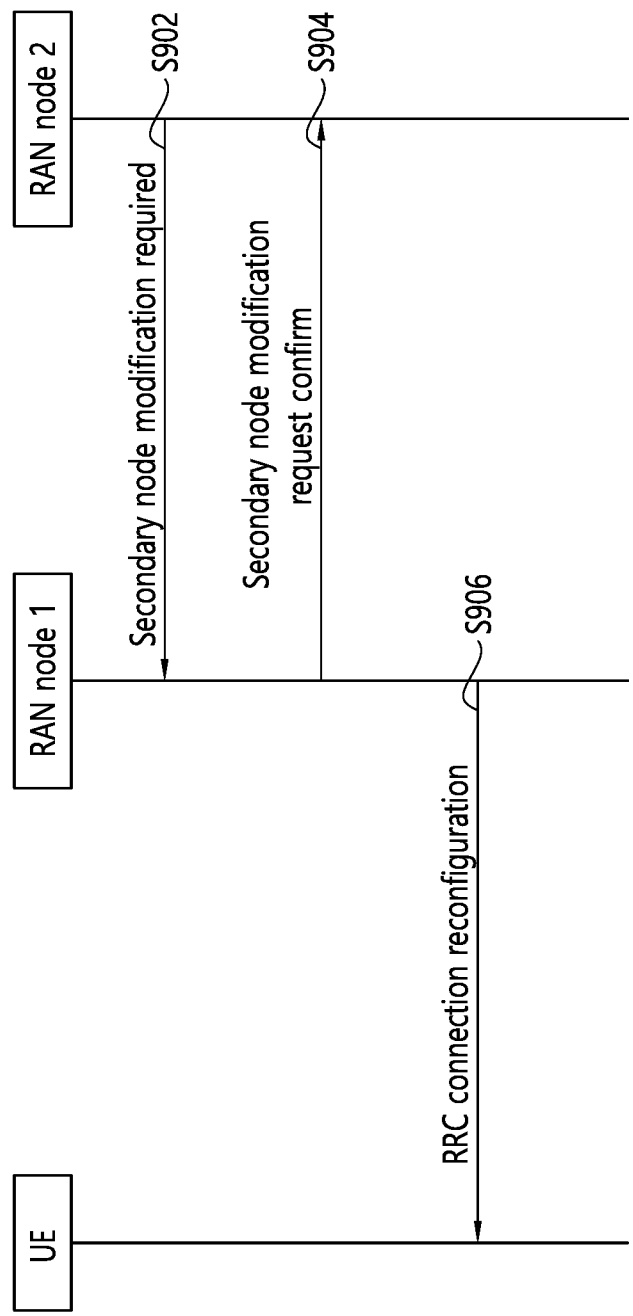
FIG. 9 shows a method for negotiating a UE capability by using a secondary node modification procedure according to another embodiment of the present disclosure.

FIG. 9 shows a method for negotiating a UE capability by using a secondary node modification procedure according to another embodiment of the present disclosure. This embodiment may be applied to the modification of a secondary node, which is triggered by the secondary node, on the UE capability related negotiation. In this embodiment, the RAN node 1 is a MN in EN-DC or MR-DC for LTE/NR interworking. The RAN node 1 may be a gNB or enhanced eNB, i.e. ng-eNB. The RAN node 2 is a SN in EN-DC or MR-DC for LTE/NR interworking. The RAN node 2 may be a gNB or enhanced eNB, i.e. ng-eNB.

The RAN node 2 decides to modify the UE capability used by the RAN node 2 on a specific UE. For example, the RAN node 2 may decide to increase the UE capability to be used by the RAN node 2. Or, the RAN node 2 may decide to decrease the UE capability to be used by the RAN node 2.

In step S902, the RAN node 2 transmits a secondary node modification required message to the RAN node 1. The secondary node modification required message may include UE capability parameters, e.g. RF capability (band combinations), buffer size (HARQ buffer split), UL transmit power, etc., which are updated (i.e. increased/decreased) to be used by the RAN node 2.

Upon receiving the secondary node modification required message from the RAN node 2, the RAN node 1 decides a UE capability to be used by the RAN node 2, based on the information received via the secondary node modification required message. For example, the RAN node 1 may just accept the UE capability updated to be used by the RAN node 2. Or, the RAN node 1 may just reject the UE capability updated to be used by the RAN node 2. Or, the RAN node 1 may decide the UE capability to be used by the RAN node 2 based on the information received via the secondary node modification required message and/or the UE capability used by the RAN node 1. The sum of the UE capability used by the RAN node 1 and the UE capability used by the RAN node 2 should not go beyond the total UE capability.

In step S904, the RAN node 1 transmits a secondary node modification required acknowledge message to the RAN node 1. The secondary node modification required acknowledge message may include UE capability parameters, e.g. RF capability (band combinations), buffer size (HARQ buffer split), UL transmit power, which are finally decided to be used by the RAN node 2. Or, the RAN node 1 may just transmit an accept message or a reject message regarding the UE capability updated to be used by the RAN node 2.

In step S906, the RAN node 1 transmits an RRC connection reconfiguration (RRCConnectionReconfigufation) message to the UE. The RRC connection reconfiguration message may include the final UE capabilities from the RAN node 1 and the RAN node 2. This step may be optional depending on the type of re-negotiated UE capability parameters. For example, if the modified UE capability is RF capability, which involves a reconfiguration of the UE, the RAN node 1 may transmit the RRCConnection Reconfiguration message to the UE. If the modified UE capability is buffer size, which does not involve a reconfiguration of the UE, the RAN node 1 may not transmit the RRC Connection Reconfiguration message to the UE.

According to the embodiment of the present disclosure, the UE capability may be coordinated/negotiated effectively between LTE/NR. In other words, in the EN-DC and/or MR-DC architecture due to tight interworking of LTE/NR, MN and SN may coordinate/negotiate the situation related to the UE capability such as buffer size or transmission power. Therefore, from the tight interworking of LTE/NR, the UE may be better served, and the problem that the sum of the UE capability in the LTE and UE capability in NR exceeds the total UE capability may not occur.

Figure 10:
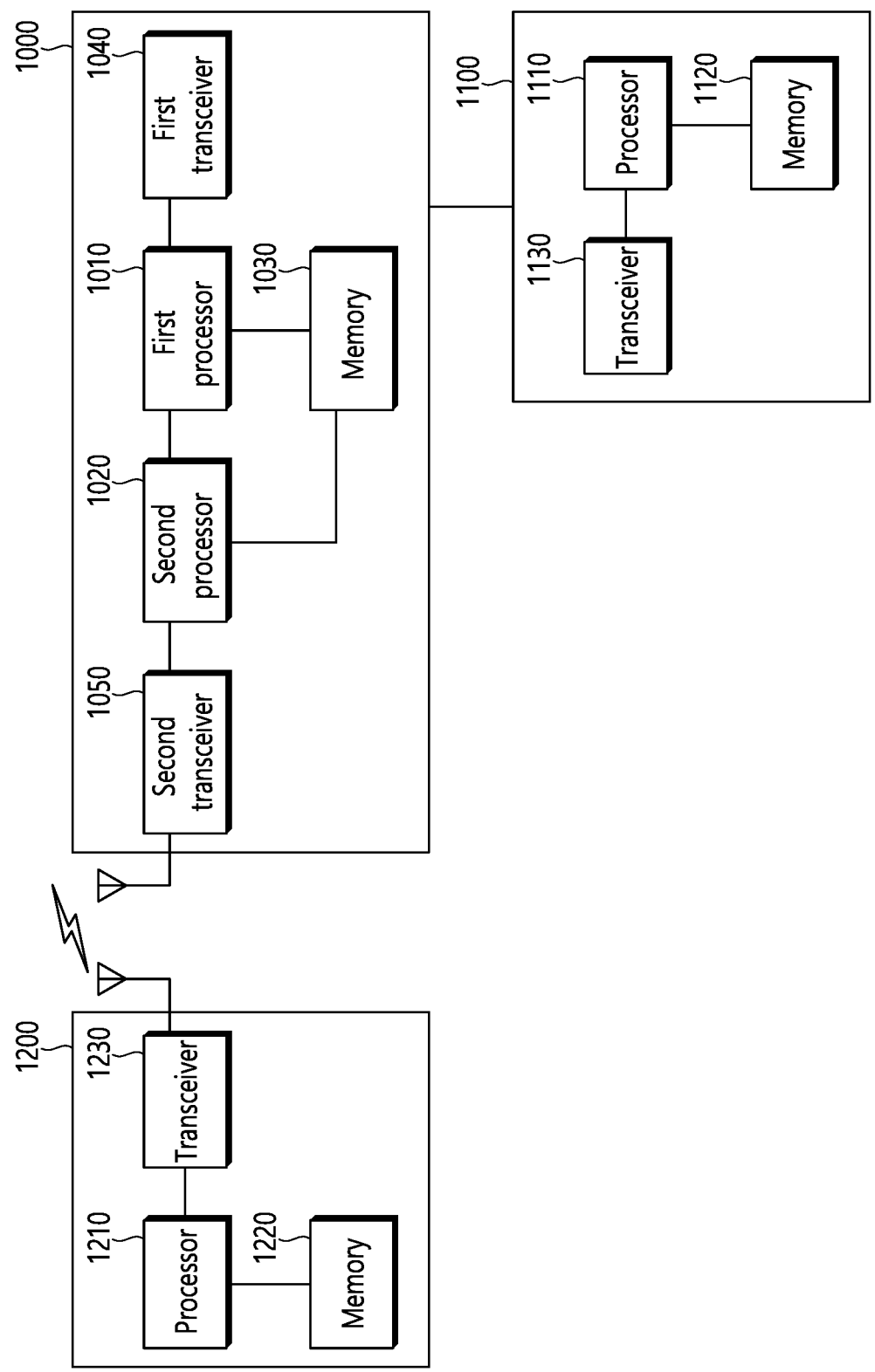
FIG. 10 shows a wireless communication system in which the embodiment of the present disclosure is implemented.

FIG. 10 shows a wireless communication system in which the embodiment of the present disclosure is implemented.

The RAN node 1 1000 includes a first processor 1010, s second processor 1020, a memory 1030, a first transceiver 1040, and a second transceiver 1050. The RAN node 1 1000 may be either gNB or ng-eNB that performs the role of MN in the interworking of LTE/NR. The memory 1030, being connected to the first processor 1010 and the second processor 1020, stores various pieces of information for operating the first processor 1010 and the second processor 1020. The first transceiver 1040, being connected to the first processor 1010, may transmit a signal to the RAN node 2 1100 or receives a signal from the RAN node 2 1100. The second transceiver 1050, being connected to the second processor 1020, may transmit a radio signal to the UE 1200 or receives a radio signal from the UE 1200.

The first processor 1010 may be configured to implement functions, processes and/or methods related to the interaction with the RAN node 2 1100 described in the present disclosure. More specifically, the first processor 1010 may control the first transceiver 1040 to perform the steps S702 and/or S704 of FIG. 7. The first processor 1010 may control the first transceiver 1040 to perform the steps S802 and/or S804 of FIG. 8. The first processor 1010 may control the first transceiver 1040 to perform the steps S902 and/or S904 of FIG. 9.

The second processor 1020 may be configured to implement functions, processes and/or methods related to the interaction with the UE 1200 described in the present disclosure. More specifically, the second processor 1020 may control the second transceiver 1050 to perform the step S706 of FIG. 7. The second processor 1020 may control the second transceiver 1050 to perform the step S806 of FIG. 8. The second processor 1020 may control the second transceiver 1050 to perform the step S906 of FIG. 9.

Although FIG. 10 assumes that the first processor 1010 and the second processor 1020 are installed independently of each other, the specific implementation is only an example. The first processor 1010 and the second processor 1020 may be integrated within one processor. Also, although FIG. 10 assumes that the first transceiver 1040 and the second transceiver 1050 are installed independently of each other, this specific implementation is also an example. The first transceiver 1040 and the second transceiver 1050 may be integrated within one transceiver.

The RAN node 2 1100 includes a processor 1110, a memory 1120, and a transceiver 1130. The RAN node 2 1100 may be either gNB or ng-eNB that performs the role of SN in the interworking of LTE/NR. The memory 1120, being connected to the processor 1110, stores various pieces of information for operating the processor 1110. The transceiver 1130, being connected to the processor 1110, may transmit a signal to the RAN node 1 1000 or receives a signal from the RAN node 1 1000. The processor 1110 may be configured to implement functions, processes and/or methods related to the interaction with the RAN node 1 1000 described in the present disclosure. More specifically, the processor 1110 may control the transceiver 1130 to perform the steps S702 and/or S704 of FIG. 7. The processor 1110 may control the transceiver 1130 to perform the steps S802 and/or S804 of FIG. 8. The processor 1110 may control the transceiver 1130 to perform the steps S902 and/or S904 of FIG. 9.

The UE 1200 includes a processor 1210, a memory 1220, and a transceiver 1230. The memory 1220, being connected to the processor 1210, stores various pieces of information for operating the processor 1210. The transceiver 1230, being connected to the processor 1210, may transmit a radio signal to the RAN node 1 1000 or receives a radio signal from the RAN node 1 1000. The processor 1210 may be configured to implement functions, processes and/or methods related to the interaction with the RAN node 1 1000 described in the present disclosure. More specifically, the processor 1210 may control the transceiver 1230 to perform the step S706 of FIG. 7. The processor 1210 may control the transceiver 1230 to perform the step S806 of FIG. 8. The processor 1210 may control the transceiver 1230 to perform the step S906 of FIG. 9.

The processor 1010, 1020, 1110, 1210 may include application-specific integrated circuit (ASIC), other chipset, logical circuit and/or data processing device. The memory 1030, 1120, 1220 may include read-only memory (ROM), random access memory (RAM), flash memory, memory card, storage medium and/or other storage device. The transceiver 1040, 1050, 1130, 1230 may include a baseband circuit for processing a radio frequency signal. When an embodiment is implemented by software, the aforementioned method may be implemented by a module (process or function) which performs the aforementioned function. The module may be stored in the memory 1030, 1120, 1220 and executed by the processor 1010, 1020, 1110, 1210. The memory 1030, 1120, 1220 may be installed inside or outside the processor 1010, 1020, 1110, 1210 and may be connected to the processor 1010, 1020, 1110, 1210 via various well-known means.

Figure 11:
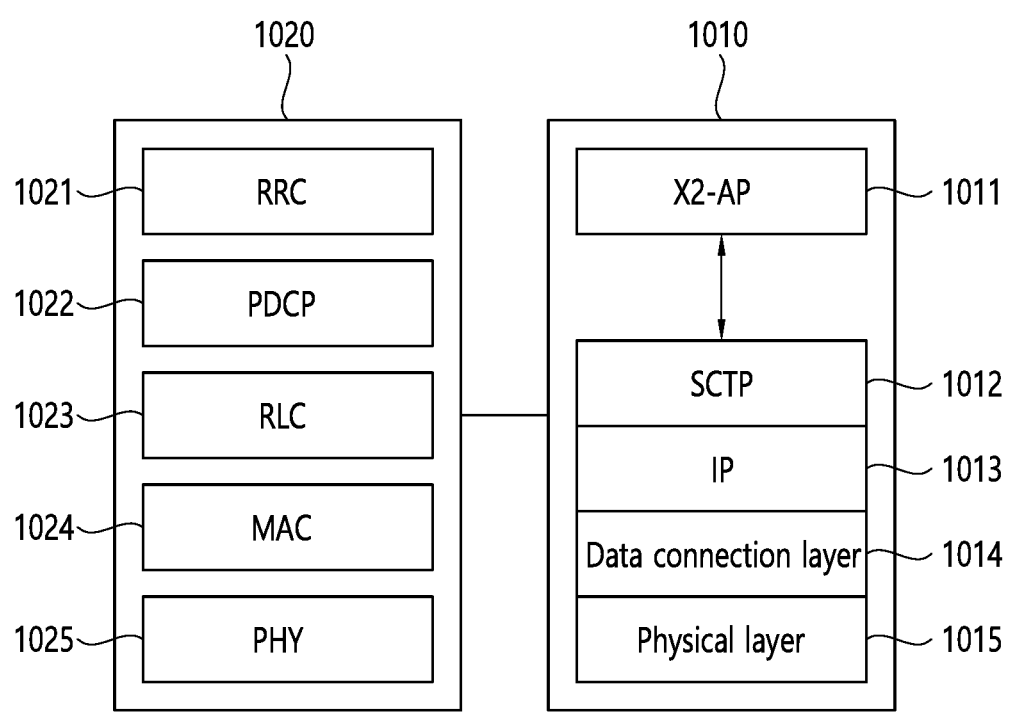
FIG. 11 shows the first and the second processor of the RAN node 1 of FIG. 10.

FIG. 11 shows the first and the second processor of the RAN node 1 of FIG. 10.

An X2 application protocol (X2-AP) layer 1011, a stream control transmission protocol (SCTP) layer 1012, an Internet protocol (IP) layer 1013, a data connection layer 1014, and a physical layer 1015 may be implemented by the first processor 1010. The X2-AP layer 1011 is included in the radio network layer (RNL). RNL defines a procedure related to the interaction between eNBs. The X2-AP layer 1011 defines the protocol responsible for providing signaling information through the X2 interface. The X2-AP layer 1011 is terminated by two eNBs connected to each other through the X2 interface. The X2-AP layer 1011 may be implemented by the X2-AP procedure module. The X2-AP layer 1011 may be configured to implement functions, processes and/or methods of the first processor 1010. The SCTP layer 1012, IP layer 1013, data connection layer 1014, and physical layer 1015 may be included in the transport network layer (TNL). TNL provides the user plane and service for signaling delivery.

An RRC layer 1021, a packet data convergence protocol (PDCP) layer 1022, a radio link control (RLC) layer 1023, a media access control (MAC) layer, and a physical layer 1025 may be implemented by the second processor 1020. The RRC layer 1021 may be configured to implement functions, processes and/or methods of the second processor 1020.

Figure 12:
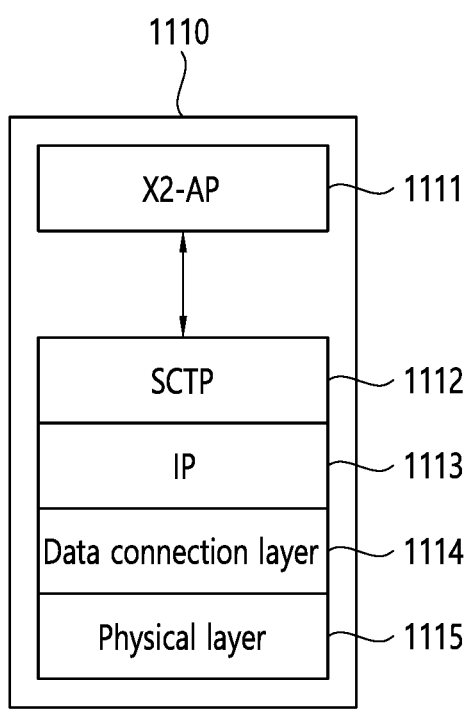
FIG. 12 shows a processor of the RAN node 2 of FIG. 10.

FIG. 12 shows a processor of the RAN node 2 of FIG. 10. The X2-AP layer 1111, SCTP layer 1112, IP layer 1113, data connection layer 1114, and physical layer 1115 may be implemented by the second processor 1110. The X2-AP layer 1111 is included in the RNL. RNL defines a procedure related to the interaction between eNBs. The X2-AP layer 1111 defines the protocol responsible for providing signaling information through the X2 interface. The X2-AP layer 1111 is terminated by two eNBs connected to each other through the X2 interface. The X2-AP layer 1111 may be implemented by the X2-Ap procedure module. The X2-AP layer 1111 may be configured to implement functions, processes and/or methods of the processor 1110. The SCTP layer 1112, IP layer 1113, data connection layer 1114, and physical layer 1115 may be included in the TNL. TNL provides the user plane and service for signaling delivery.

Figure 13:
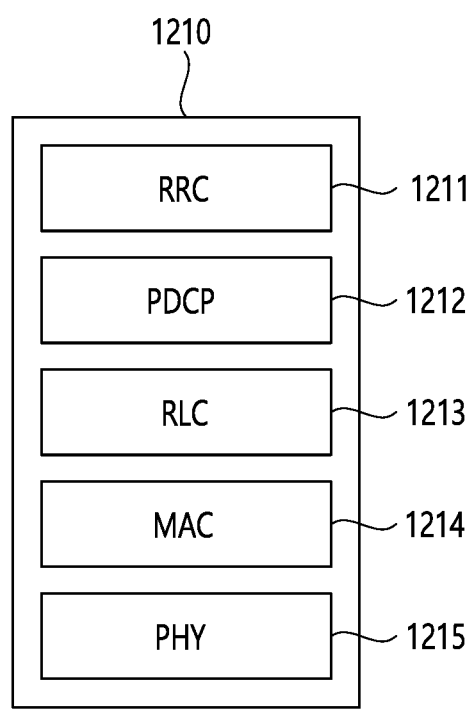
FIG. 13 shows a processor of the UE of FIG. 10.

FIG. 13 shows a processor of the UE of FIG. 10. The RRC layer 1211, PDCP layer 1212, RLC layer 1213, MAC layer 1214, and physical layer 1215 may be implemented by the processor 1210. The RRC layer 1211 may be configured to implement functions, processes and/or methods of the processor 1210.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a master node in a wireless communication system, the method comprising:

receiving, from a secondary node, a secondary node modification required message including a first information on a second user equipment (UE) capability on a specific UE for the secondary node, wherein the first information includes recommended UE capability parameters for the second UE capability;

determining final UE capability parameters for the second UE capability, based on (1) the recommended UE capability parameters, and (2) a first UE capability on the specific UE for the master node; and transmitting, to the secondary node, a secondary node modification required acknowledgement message including a second information on the second UE capability, wherein the second information includes the final UE capability parameters for the second UE capability; and transmitting, to the specific UE, a radio resource control (RRC) connection reconfiguration message including a third information on the first UE capability and the second UE capability after deciding the final UE capability parameters, wherein the third information includes the final UE capability parameters for the second UE capability;

wherein the first UE capability and the second UE capability includes (1) a radio frequency (RF) capability, (2) a buffer size, and (3) a uplink (UL) transmit power as UE capability parameters, wherein a sum of the first UE capability and the second UE capability does not exceed a total UE capability, and wherein the master node and the secondary node are in dual connectivity between a 3rd generation partnership project (3GPP) long-term evolution (LIE) and a new radio access technology (NR).

2. The method of claim 1, wherein the secondary node modification required message and the modification required acknowledge message are related to the secondary node modification procedure initiated by the second RAN node.

3. The method of claim 1, wherein the second information on the second UE capability includes an updated information for the second UE capability to be used by the second RAN node.

4. The method of claim 1, wherein the UE is in communication with at least one of a mobile device, a network, and/or autonomous vehicles other than the UE.

5. The method of claim 1, wherein the master node is one of gNB or ng-eNB, and wherein the secondary node is another one of gNB or ng-eNB.

* * * * *